(12) United States Patent
Klatt et al.

(10) Patent No.: US 6,716,899 B1
(45) Date of Patent: Apr. 6, 2004

(54) FLAME-PROOFED POLYESTER MOLDING MATERIALS

(75) Inventors: Martin Klatt, Mannheim (DE); Michael Nam, Ludwigshafen (DE); Herbert Fisch, Wachenheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/674,540

(22) PCT Filed: Apr. 23, 2000

(86) PCT No.: PCT/EP99/02728
§ 371 (c)(1),
(2), (4) Date: Nov. 2, 2000

(87) PCT Pub. No.: WO99/57192
PCT Pub. Date: Nov. 11, 1999

(30) Foreign Application Priority Data

May 7, 1998 (DE) ......................... 198 20 399

(51) Int. Cl.⁷ .................. C08K 5/5377; C08K 5/5397; C08K 5/521; C08K 5/524
(52) U.S. Cl. .................. 524/133; 524/126; 524/135; 524/139; 524/140; 524/141
(58) Field of Search ................. 524/133, 139, 524/126, 135, 140, 141

(56) References Cited

U.S. PATENT DOCUMENTS

| | | | |
|---|---|---|---|
| 3,629,365 A | * | 12/1971 | Gardner |
| 3,900,444 A | * | 8/1975 | Racky et al. |
| 4,180,495 A | | 12/1979 | Sandler et al. |
| 4,246,378 A | * | 1/1981 | Kometani et al. |
| 4,530,953 A | * | 7/1985 | Yoshida |
| 5,552,465 A | * | 9/1996 | Witmann et al. |
| 5,684,071 A | * | 11/1997 | Mogami et al. |
| 5,780,534 A | | 7/1998 | Kleiner et al. |
| 5,814,690 A | * | 9/1998 | Penn |
| 6,013,707 A | * | 1/2000 | Kleiner et al. |
| 6,365,071 B1 | * | 4/2002 | Jenewein et al. |

FOREIGN PATENT DOCUMENTS

| | | |
|---|---|---|
| EP | 661 3342 | 7/1995 |
| EP | 699 708 | 3/1996 |
| WO | 39053 | * 10/1997 |
| WO | 98/17720 | 4/1998 |

OTHER PUBLICATIONS

Hawley's Condensed Chemical Dictionary, Twelfth Edition (1993), Revised by Richard J. Lewis, Sr., Van Nostrand Reinhold Company, New York, pp. 855–856.*
Dewent 92–936273/05.
Dewent 93–137101/17.
Dewent 97–369652/34.

* cited by examiner

*Primary Examiner*—Peter Szekely
(74) *Attorney, Agent, or Firm*—Keil & Weinkauf

(57) ABSTRACT

Thermoplastic molding compositions comprise
A) from 5 to 96% by weight of a polyester,
B) from 1 to 30% by weight of a phosphinate of formula I and/or of a diphosphinate of formula II and/or polymers of these

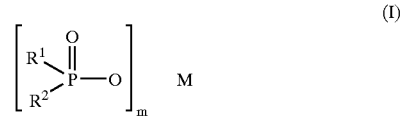

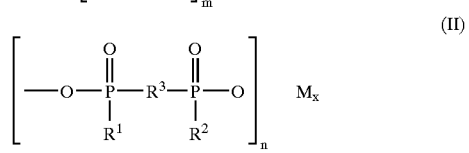

where:
$R^1$ and $R^2$ are linear or branched $C_1$–$C_6$-alkyl, phenyl or hydrogen,
$R^3$ is linear or branched $C_1$–$C_{10}$-alkylene, arylene, alkylarylene or arylalkylene,
M is an alkaline-earth or alkali metal, Zn, Al, Fe or B,
m is an integer from 1 to 3,
n is an integer from 1 to 3,
is 1 or 2 and C) from 1 to 30% by weight of at least one organic phosphorus-containing flame retardant,
D) from 0 to 5% by weight of at least one ester or amide of saturated or unsaturated aliphatic carboxylic acids having from 10 to 40 carbon atoms with saturated aliphatic alcohols or amines having from 2 to 40 carbon atoms, and
E) from 0 to 60% by weight of other additives, where the total of the percentages by weight of components A) to E) is 100%.

10 Claims, No Drawings

FLAME-PROOFED POLYESTER MOLDING MATERIALS

The invention further relates to the use of the novel molding compositions for producing fibers, films or moldings, and also to the resultant moldings of any type.

The market is increasingly interested in halogen-free flame-retardant polyesters. Significant requirements placed upon the flame retardant are: pale intrinsic color, adequate heat stability for incorporation into thermoplastics, and also effectiveness in reinforced and unreinforced polymer (wicking effect of glass fibers).

The UL 94 fire test for unreinforced polyesters should be passed here at the V-0 level. For reinforced polyesters, at least the V-2 classification should be obtained and/or the glow-wire test passed.

Besides halogen-containing systems there are in principle four halogen-free FR systems used in thermoplastics:
  Inorganic flame retardants, which have to be used in large amounts to be effective.
  Nitrogen-containing FR systems, such as melamine cyanurate, which has limited effectiveness in thermoplastics, e.g. polyamide. In reinforced polyamide it is effective only in combination with shortened glass fibers. Melamine cyanurate by itself is not effective in polyesters.
  Phosphorus-containing FR systems, which are generally not very effective in polyesters.
  Phosphorus/nitrogen-containing FR systems, such as ammonium polyphosphates or melamine phosphates, which do not have sufficient thermal stability for thermoplastics processed at temperatures above 200° C.

JP-A 03/281 652 has disclosed polyalkylene terephthalates which comprise melamine cyanurate and glass fibers, and also a phosphorus-containing flame retardant. These molding compositions comprise derivatives of phosphoric acid, such as phosphoric esters (valence state +5), which tend to bleed out on exposure to heat.

These disadvantages are also seen for the combination of melamine cyanurate (MC) with resorcinol bis(diphenyl phosphate), known from JP-A 05/070 671. These molding compositions also have high phenol values during processing and do not have adequate mechanical properties.

JP-A 09/157 503 has disclosed polyester molding compositions with MC, phophorus compounds and lubricants, comprising less than 10% of reinforcing agents. Molding compositions of this type have flame-retardant and mechanical properties which are not fully satisfactory. The same applies to migration and phenol formation during processing.

EP-A 699 708 and BE-A 875 530 have disclosed salts of phosphinic acid as flame retardants for polyesters.

WO 97/05705 has disclosed combinations of MC with phosphorus-containing compounds and lubricants for polyesters.

It is an object of the present invention to provide flame-retardant polyester molding compositions which achieve an adequate UL 94 classification and pass the glow-wire test. At the same time, mold deposit should be minimized and flowability during processing should be improved.

We have found that this object is achieved by means of the thermoplastic molding compositions defined at the outset. Preferred embodiments are given in the subclaims.

The novel molding compositions comprise, as component (A), from 5 to 96% by weight, preferably from 10 to 70% by weight and in particular from 10 to 60% by weight, of a thermoplastic polyester.

Use is generally made of polyesters based on aromatic dicarboxylic acids and on an aliphatic or aromatic dihydroxy compound.

A first group of preferred polyesters is that of polyalkylene terephthalates having from 2 to 10 carbon atoms in the alcohol moiety.

Polyalkylene terephthalates of this type are known per se and are described in the literature. Their main chain contains an aromatic ring which derives from the aromatic dicarboxylic acid. There may also be substitution in the aromatic ring, e.g. by halogen, such as chlorine or bromine, or by $C_1$–$C_4$-alkyl, such as methyl, ethyl, iso- or n-propyl, or n-, iso- or tert-butyl.

These polyalkylene terephthalates may be prepared by reacting aromatic dicarboxylic acids, or their esters or other ester-forming derivatives, with aliphatic dihydroxy compounds in a manner known per se.

Preferred dicarboxylic acids are 2,6-naphthalenedicarboxylic acid, terephthalic acid and isophthalic acid, and mixtures of these. Up to 30 mol %, preferably not more than 10 mol %, of the aromatic dicarboxylic acids may be replaced by aliphatic or cycloaliphatic dicarboxylic acids, such as adipic acid, azelaic acid, sebacic acid, dodecanedioic acids or cyclohexanedicarboxylic acids.

Preferred aliphatic dihydroxy compounds are diols having from 2 to 6 carbon atoms, in particular 1,2-ethanediol, 1,3-propanediol, 1,4-butanediol, 1,6-hexanediol, 1,4-hexanediol, 1,4-cyclohexanediol, 1,4-cyclohexanedimethanol and neopentyl glycol, and mixtures of these.

Particularly preferred polyesters (A) are polyalkylene terephthalates derived from alkanediols having from 2 to 6 carbon atoms. Among these, particular preference is given to polyethylene terephthalate, polypropylene terephthalate and polybutylene terephthalate, and mixtures of these. Preference is also given to PET and/or PBT which comprise, as further monomer units, up to 1% by weight, preferably up to 0.75% by weight, of 1,6-hexanediol and/or 5-methyl-1,5-pentanediol.

The viscosity number of the polyesters (A) is generally in the range from 50 to 220, preferably from 80 to 160 (measured in 0.5% strength by weight solution in a phenol/o-dichlorobenzene mixture with a weight ratio of 1:1 at 25° C.) in accordance with ISO 1628.

Particular preference is given to polyesters whose carboxyl end group content is up to 100 mval/kg of polyester, preferably up to 50 mval/kg of polyester and in particular up to 40 mval/kg of polyester. Polyesters of this type may be prepared, for example, by the process of DE-A 44 01 055. The carboxyl end group content is usually determined by titration methods (e.g. potentiometry).

Particularly preferred molding compositions comprise, as component A), a mixture of polyethylene terephthalate (PET) and polybutylene terephthalate (PBT). The proportion of the polyethylene terephthalate in the mixture is preferably up to 50% by weight, in particular from 10 to 30% by weight, based on 100% by weight of A).

Novel molding compositions of this type have very good flame-retardant properties and improved mechanical properties.

It is also advantageous to use recycled PET materials (also termed scrap PET) in a mixture with polyalkylene terephthalates, such as PBT.

Recycled materials are generally:
1) those known as post-industrial recycled materials: these are production wastes from polycondensation or from processing, e.g. sprues from injection molding, start-up material from injection molding or extrusion, or edge trims from extruded sheets or films.

2) Post-consumer recycled materials: these are plastic items which are collected and treated after utilization by the end consumer. Blow-molded PET bottles for mineral water, soft drinks and juices are easily the predominant items in quantity terms.

Both types of recycled material may be used either in ground or pellet form. In the latter case, the crude recycled materials are isolated and purified, and then melted and pelletized using an extruder. This usually facilitates handling and free flow, and also metering for further steps in processing.

The recycled materials used may either be pellets or regrind. The edge length should not be more than 6 mm, preferably less than 5 mm.

Because polyesters undergo hydrolytic cleavage during processing (due to traces of moisture) it is advisable to predry the recycled material. The residual moisture after drying is preferably from 0.01 to 0.7%, in particular from 0.2 to 0.6%.

Another class to be mentioned is that of fully aromatic polyesters deriving from aromatic dicarboxylic acids and aromatic dihydroxy compounds.

Suitable aromatic dicarboxylic acids are the compounds previously mentioned for the polyalkylene terephthalates. The mixtures preferably used are made from 5 to 100 mol % of isophthalic acid and from 0 to 95 mol % of terephthalic acid, in particular from about 50 to about 80% of terephthalic acid and from 20 to about 50% of isophthalic acid.

The aromatic dihydroxy compounds preferably have the formula

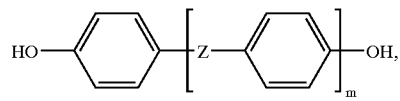

where Z is alkylene or cycloalkylene having up to 8 carbon atoms, arylene having up to 12 carbon atoms, carbonyl, sulfonyl, oxygen or sulfur or a chemical bond, and m is from 0 to 2. The phenylene groups in the compounds may also have substitution by $C_1$–$C_6$-alkyl or alkoxy, and fluorine, chlorine or bromine.

Examples of parent compounds for these compounds are

Dihydroxydiphenyl,

Di(hydroxyphenyl)alkane,

Di(hydroxyphenyl)cycloalkane,

Di(hydroxyphenyl) sulfide,

Di(hydroxyphenyl) ether,

Di(hydroxyphenyl) ketone,

Di(hydroxyphenyl) sulfoxide,

α,α'-di(hydroxyphenyl)dialkylbenzene,

Di(hydroxyphenyl) sulfone, di(hydroxybenzoyl)benzene, resorcinol, and hydroquinone, and also the ring-alkylated and ring-halogenated derivatives of these.

Among these, preference is given to 4,4'-Dihydroxydiphenyl, 2,4-Di(4'-hydroxyphenyl)-2-methylbutane α,α'-Di(4-hydroxyphenyl)-p-diisopropylbenzene, 2,2-Di(3'-methyl-4'-hydroxyphenyl)propane and 2,2-Di(3'-chloro-4'-hydroxyphenyl)propane, and in particular to 2,2-Di(4'-hydroxyphenyl)propane 2,2-Di(3',5-dichlorodihydroxyphenyl)propane, 1,1-Di(4'-hydroxyphenyl)cyclohexane, 3,4'-Dihydroxybenzophenone, 4,4'-Dihydroxydiphenyl sulfone, and 2,2-Di(3',5'-dimethyl-4'-hydroxyphenyl)propane, or mixtures of these.

It is, of course, also possible to use mixtures of polyalkylene terephthalates and fully aromatic polyesters. These generally comprise from 20 to 98% by weight of the polyalkylene terephthalate and from 2 to 80% by weight of the fully aromatic polyester.

For the purposes of the present invention, polyesters include polycarbonates which have been obtained by polymerizing aromatic dihydroxy compounds, in particular 2,2-bis(4-hydroxyphenyl)-propane (bisphenol A) or its derivatives, e.g. with phosgene. Corresponding products are known per se and are described in the literature, and many of them are also commercially available. The amount of the polycarbonates is up to 90% by weight, preferably up to 50% by weight, based on 100% by weight of component (A).

It is, of course, also possible to use polyester block copolymers, such as copolyetheresters. Products of this type are known per se and are described in the literature, e.g. in U.S. Pat. No. 3,651,014. Corresponding products are also available commercially, e.g. Hytrel® (DuPont).

The novel molding compositions comprise, as component B), from 0.1 to 30% by weight, preferably from 1 to 25% by weight and in particular from 10 to 20% by weight, of a phosphinate of formula (I) and/or a diphosphinate of formula (II) and/or polymers of these

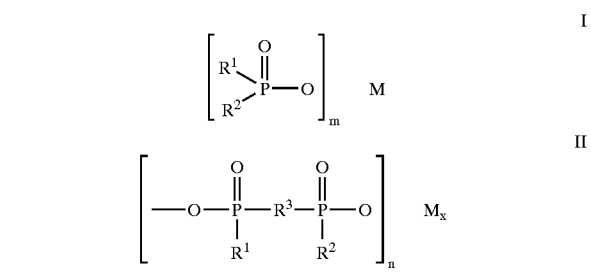

where:

$R^1$ and $R^2$ are hydrogen or $C_1$–$C_6$-alkyl, preferably $C_1$–$C_4$-alkyl, linear or branched, e.g. methyl, ethyl, n-propyl, isopropyl, n-butyl, tert-butyl or n-pentyl; phenyl; where preferably at least one of the radicals $R^1$ and $R^2$ is hydrogen and in particular $R^1$ and $R^2$ are hydrogen;

$R^3$ is $C_1$–$C_{10}$-alkylene, linear or branched, e.g. methylene, ethylene, n-propylene, isopropylene, n-butylene, tert-butylene, n-pentylene, n-octylene or n-dodecylene; arylene, e.g. phenylene or naphthylene; alkylarylene, e.g. methylphenylene, ethylphenylene, tert-butylphenylene, methylnaphthylene, ethylnaphthylene or tert-butylnaphthylene; arylalkylene, e.g. phenylmethylene, phenylethylene, phenylpropylene or phenylbutylene;

M is an alkaline-earth or alkali metal, Al, Zn, Fe or B, m is an integer from 1 to 3;

n is an integer from 1 to 3, and x is 1 or 2.

Particular preference is given to compounds of formula II where $R^1$ and $R^2$ are hydrogen, where M is preferably Zn or Al, and particular preference is given to calcium phosphinate.

Products of this type are available commercially, for example as calcium phosphinate.

Examples of suitable salts of formula I or II where only one of $R^1$ and $R^2$ is hydrogen are salts of phenylphosphinic acid, preference being given to its Na and/or Ca salts.

Suitable organic phosphorus-containing flame retardants C) are present in the novel molding compositions in amounts of from 1 to 30% by weight, preferably from 1 to 25% by weight, and in particular from 5 to 20% by weight, based on the total weight of components A) to E).

Organic phosphorus-containing compounds for component C) have phosphorus in a valence state of from −3 to +5. For the purposes of the invention the valence state is the oxidation state as given in Lehrbuch der Anorganischen Chemie, by A. F. Hollemann and E. Wiberg, Walter des Gruyter and Co. (1964, 57th to 70th edition), pages 166–177. Phosphorus compounds of the valence states from −3 to +5 derive from phosphine (−3), diphosphine (−2), phosphine oxide (−1), elemental phosphorus (+0), hypophosphorous acid (+1), phosphorous acid (+3), hypodiphosphoric acid (+4) and phosphoric acid (+5).

Only a few examples will be mentioned from the large number of phosphorus-containing compounds.

Examples of phosphorus compounds of the phosphine class, having the valence state −3, are aromatic phosphines, such as triphenylphosphine, tritolylphosphine, trinonylphosphine, trinaphthylphosphine, etc. Triphenylphosphine is particularly suitable.

Examples of phosphorus compounds of the diphosphine class, having the valence state −2, are tetraphenyldiphosphine, tetranaphthyldiphosphine, etc. Tetranaphthyldiphosphine is particularly suitable.

Phosphorus compounds of the valence state −1 derive from phosphine oxide.

Suitable compounds are phosphine oxides of formula III

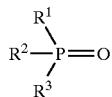

III where $R^1$, $R^2$ and $R^3$ are identical or different and are alkyl, aryl, alkylaryl or cycloalkyl having from 8 to 40 carbon atoms.

Examples of phosphine oxides are triphenylphosphine oxide, tritolylphosphine oxide, trisnonylphenylphosphine oxide, tricyclohexylphosphine oxide, tris(n-butyl)phosphine oxide, tris(n-hexyl)phosphine oxide, tris(n-octyl)phosphine oxide, tris(cyanoethyl)phosphine oxide, benzylbis(cyclohexyl)phosphine oxide, benzylbisphenylphosphine oxide and phenylbis(n-hexyl)phosphine oxide. Other preferred compounds are oxidized reaction products of phosphine and aldehydes, in particular from tert-butylphosphine with glyoxal. Particular preference is given to the use of triphenylphosphine oxide, tricyclohexylphosphine oxide or tris(n-octyl)phosphine oxide.

Other suitable compounds are triphenylphosphine sulfide and its derivatives as described above for phosphine oxides and triphenyl phosphate.

Examples of phosphorus compounds of the oxidation state +1 are hypophosphites, e.g. organic hypophosphites, such as cellulose hypophosphite esters, esters of hypophosphorous acids with diols, e.g. that of 1,10-dodecanediol. It is also possible to use substituted phosphinic acids and anhydrides of these, e.g. diphenylphosphinic acid. Other possible compounds are di-p-tolylphosphinic acid and dicresylphosphinic anhydride. Compounds such as the bis(diphenylphosphinic)esters of hydroquinone, ethylene glycol and propylene glycol, inter alia, may also be used. Other suitable compounds are aryl(alkyl)phosphinamides, such as the dimethylamide of diphenylphosphinic acid, and sulfonamidoaryl(alkyl)phosphinic acid derivatives, such as p-tolylsulfonamidodiphenylphosphinic acid. Preference is given to the use of the bis(diphenylphosphinic)esters of hydroquinone and ethylene glycol and of the bis (diphenylphosphinate) of hydroquinone.

Phosphorus compounds of the oxidation state +3 derive from phosphorous acid. Suitable compounds are cyclic phosphonates which derive from pentaerythritol, from neopentyl glycol or from pyrocatechol, e.g.

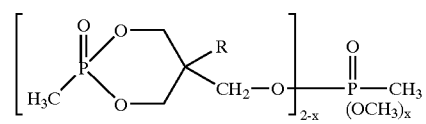

where R is $C_1–C_4$-alkyl, preferably methyl, and X is 0 or 1 (Amgard® P45 from Albright & Wilson).

Phosphorus of the valence state +3 is also present in triaryl(alkyl) phosphites, such as triphenyl phosphite, tris(4-decylphenyl) phosphite, tris(2,4-di-tert-butylphenyl) phosphite and phenyl didecyl phosphite. It is also possible to use diphosphites, such as propylene glycol 1,2-bis(diphosphite) or cyclic phosphites which derive from pentaerythritol, from neopentylglycol or from pyrocatechol.

Particular preference is given to neopentyl glycol methylphosphonate and methyl neopentyl glycol phosphite, and also to pentaerythritol dimethyldiphosphonate and dimethyl pentaerythritol diphosphite.

Phosphorus compounds of oxidation state +4 which may be used are particularly hypodiphosphates, such as tetraphenyl hypodiphosphate and bisneopentyl hypodiphosphate.

Phosphorus compounds of oxidation state +5 which may be used are particularly alkyl- and aryl-subsituted phosphates. Examples of these are phenyl bisdodecyl phosphate, phenyl ethyl hydrogen phosphate, phenyl bis(3,5,5-trimethylhexyl) phosphate, ethyl diphenyl phosphate, 2-ethylhexyl ditolyl phosphate, diphenyl hydrogen phosphate, bis(2-ethylhexyl) p-tolyl phosphate, tritolyl phosphate, bis(2-ethylhexyl) phenyl phosphate, di(nonyl) phenyl phosphate, phenyl methyl hydrogenphosphate, di(dodecyl) p-tolyl phosphate, p-tolylbis(2,5,5-trimethylhexyl) phosphate and 2-ethylhexyl diphenyl phosphate. Particularly suitable phosphorus compounds are those in which each radical is aryloxy. Very particularly suitable compounds are triphenyl phosphate and resorcinol bis(diphenyl phosphate) and its ring-substituted derivatives of formula IV (RDPs):

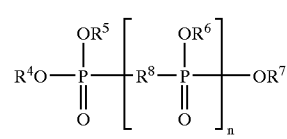

IV where:

$R^4$ to $R^7$ are aromatic radicals having from 6 to 20 carbon atoms, preferably phenyl, which may have substitution by alkyl groups having from 1 to 4 carbon atoms, preferably methyl, $R^8$ is a bivalent phenol radical, preferably

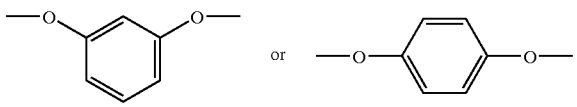

and n is an average value of from 0.1 to 100, preferably from 0.5 to 50, in particular from 0.8 to 10 and very particularly from 1 to 5.

Due to the process used for their manufacture, RDP products available commercially under the tradename Fyroflex®-RDP (Akzo Nobel) and also CR 733-S (Daihachi) are mixtures of about 85% of RDP with about 2.5% of triphenyl phosphate and also about 12.5% of oligomeric fractions in which the degree of oligomerization is mostly less than 10.

It is also possible to use cyclic phosphates. Of these, diphenyl pentaerythritol diphosphate and phenyl neopentyl phosphate are particularly suitable.

Besides the low-molecular-weight phosphorus compounds mentioned above, it is also possible to use oligomeric or polymeric phosphorus compounds.

Polymeric, halogen-free organic phosphorus compounds of this type with phosphorus in the polymer chain are produced, for example, in the preparation of pentacyclic unsaturated phosphine dihalides, as described, for example, in DE-A 20 36 173. The molecular weight of these polyphospholine oxides, measured by vapor-pressure osmometry in dimethylformamide, should be in the range from 500 to 7000, preferably from 700 to 2000.

The phosphorus here has the oxidation state −1.

It is also possible to use inorganic coordination polymers of aryl(alkyl)phosphinic acids, such as poly-β-sodium(I) methylphenylphosphinate. Their preparation is given in DE-A 31 40 520. The phosphorus has the oxidation number +1.

Halogen-free polymeric phosphorus compounds of this type may also be produced by the reaction of a phosphonic acid chloride, such as phenyl-, methyl-, propyl-, styryl- or vinylphosphonyl dichloride, with dihydric phenols, such as hydroquinone, resorcinol, 2,3,5-trimethylhydroquinone, bisphenol A or tetramethylbisphenol A.

Other halogen-free polymeric phosphorus compounds which may be present in the novel molding compositions are prepared by reacting phosphorus oxytrichloride or phosphoric ester dichlorides with a mixture of mono-, di- or trihydric phenols and other compounds carrying hydroxyl groups (cf. Houben-Weyl-Muller, Thieme-Verlag Stuttgart, Organische Phosphorverbindungen Part II (1963)). It is also possible to produce polymeric phosphonates via transesterification reactions of phosphonate esters with dihydric phenols (cf. DE-A 29 25 208) or via reactions of phosphonate esters with diamines, or with diamides or hydrazides (cf. U.S. Pat. No. 4,403,075). The inorganic compound poly(ammonium phosphate) may also be used.

It is also possible to use oligomeric pentaerythritol phosphites, pentaerythritol phosphates and pentaerythritol phosphonates, as in EP-B 8 486, for example Mobil Antiblaze® 19 (registered trademark of Mobil Oil).

The novel molding compositions may comprise, as component D), from 0 to 5% by weight, preferably from 0.05 to 3% by weight, and in particular from 0.1 to 2% by weight, of at least one ester or amide of saturated or unsaturated aliphatic carboxylic acids having from 10 to 40 carbon atoms, preferably from 16 to 22 carbon atoms, with saturated aliphatic alcohols or amines having from 2 to 40 carbon atoms, preferably from 2 to 6 carbon atoms.

The carboxylic acids may be mono- or dibasic. Examples which may be mentioned are pelargonic acid, palmitic acid, lauric acid, margaric acid, dodecanedioic acid, behenic acid and, particularly preferably, stearic acid, capric acid and montanic acid (a mixture of fatty acids having from 30 to 40 carbon atoms).

The aliphatic alcohols may be mono- to tetrahydric. Examples of alcohols are n-butanol, n-octanol, stearyl alcohol, ethylene glycol, propylene glycol, neopentyl glycol and pentaerythritol. Glycerol and pentaerythritol are preferred.

The aliphatic amines may be mono- to tribasic. Examples of these are stearylamine, ethylenediamine, propylendiamine, hexamethylenediamine and di(6-aminohexyl)amine. Ethylenediamine and hexamethylenediamine are particularly preferred. Correspondingly, preferred esters or amides are glycerol distearate, glycerol tristearate, ethylenediammonium distearate, glycerol monopalmitate, glycerol trilaurate, glycerol monobehenate and pentaerythritol tetrastearate.

It is also possible to use mixtures of different esters or amides or combinations of esters with amides. The mixing ratio may be as desired.

The novel molding compositions may comprise, as component E), from 0 to 60% by weight, in particular up to 50% by weight, of other additives.

Examples of usual additives E) are amounts of up to 40% by weight, preferably up to 30% by weight, of elastomeric polymers (also frequently termed impact modifiers, elastomers or rubbers).

These are very generally copolymers which have preferably been built up from at least two of the following monomers: ethylene, propylene, butadiene, isobutene, isoprene, chloroprene, vinyl acetate, styrene, acrylonitrile and acrylates and/or methacrylates having from 1 to 18 carbon atoms in the alcohol component.

Polymers of this type have been described, for example, in Houben-Weyl, Methoden der organischen Chemie, Vol. 14/1 (Georg-Thieme-Verlag, Stuttgart, 1961), pp. 392–406 and in the monograph by C. B. Bucknall, "Toughened Plastics" (Applied Science Publishers, London, 1977).

Some preferred types of such elastomers are described below.

Preferred types of such elastomers are those known as ethylene-propylene (EPM) and ethylene-propylene-diene (EPDM) rubbers.

EPM rubbers generally have practically no residual double bonds, whereas EPDM rubbers may have from 1 to 20 double bonds per 100 carbon atoms.

Examples of diene monomers for EPDM rubbers are conjugated dienes, such as isoprene and butadiene, nonconjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, and also alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyl-tricyclo[5.2.1.0$^{2,6}$]-3,8-decadiene, or mixtures of these. Preference is given to 1,5-hexadiene, 5-ethylidenenorbornene and dicyclopentadiene. The diene content of the EPDM rubbers is preferably from 0.5 to 50% by weight, in particular from 1 to 8% by weight, based on the total weight of the rubber.

EPM and EPDM rubbers may preferably also have been grafted with reactive carboxylic acids or with derivatives of these. Examples of these are acrylic acid, methacrylic acid and derivatives thereof, e.g. glycidyl (meth)acrylate, and also maleic anhydride.

Copolymers of ethylene with acrylic acid and/or methacrylic acid and/or with the esters of these acids are another group of preferred rubbers. The rubbers may also include dicarboxylic acids, such as maleic acid and fumaric acid, or derivatives of these acids, e.g. esters and anhydrides, and/or monomers containing epoxy groups. These dicarboxylic acid derivatives and/or monomers containing epoxy groups are preferably incorporated into the rubber by adding, to the monomer mixture, monomers containing dicarboxylic acid groups and/or epoxy groups and having the formula I, II, III or IV

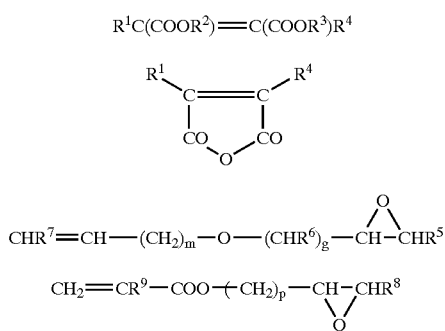

where $R^1$ to $R^9$ are hydrogen or alkyl having from 1 to 6 carbon atoms, and m is an integer from 0 to 20, g is an integer from 0 to 10 and p is an integer from 0 to 5.

$R^1$ to $R^9$ are preferably hydrogen, where m is 0 or 1 and g is 1. The corresponding compounds are maleic acid, fumaric acid, maleic anhydride, allyl glycidyl ether and vinyl glycidyl ether.

Preferred compounds of the formulae I, II and IV are maleic acid, maleic anhydride and (meth)acrylates containing epoxy groups, such as glycidyl acrylate and glycidyl methacrylate, and the esters with tertiary alcohols, such as tert-butyl acrylate. Although the latter have no free carboxyl groups their behavior approximates to that of the free acids and they are therefore termed monomers with latent carboxyl groups.

The copolymers are advantageously composed of from 50 to 98% by weight of ethylene, from 0.1 to 20% by weight of monomers containing epoxy groups and/or methacrylic acid and/or monomers containing anhydride groups, the remaining amount being (meth)acrylates.

Particular preference is given to copolymers made from from 50 to 98% by weight, in particular from 55 to 95% by weight, of ethylene, from 0.1 to 40% by weight, in particular from 0.3 to 20% by weight, of glycidyl acrylate and/or glycidyl methacrylate, (meth)acrylic acid and/or maleic anhydride, and from 1 to 45% by weight, in particular from 10 to 40% by weight, of n-butyl acrylate and/or 2-ethylhexyl acrylate.

Other preferred (meth)acrylates are the methyl, ethyl, propyl, isobutyl and tert-butyl esters.

Besides these, comonomers which may be used are vinyl esters and vinyl ethers.

The ethylene copolymers described above may be prepared by processes known per se, preferably by random copolymerization at high pressure and elevated temperature. Appropriate processes are well known.

Preferred elastomers also include emulsion polymers whose preparation is described, for example, by Blackley in the monograph "Emulsion Polymerization". The emulsifiers and catalysts which may be used are known per se.

In principle it is possible to use homogeneously structured elastomers or those with a shell construction. The shell-type structure is a result of the sequence of addition of the individual monomers. The morphology of the polymers is also affected by this sequence of addition.

Monomers which may be mentioned here, merely as examples, for the preparation of the rubber fraction of the elastomers are acrylates, such as n-butyl acrylate and 2-ethylhexyl acrylate, and corresponding methacrylates, and butadiene and isoprene, and also mixtures of these. These monomers may be copolymerized with other monomers, such as styrene, acrylonitrile or with vinyl ethers and with other acrylates or methacrylates, such as methyl methacrylate, methyl acrylate, ethyl acrylate or propyl acrylate.

The soft or rubber phase (with a glass transition temperature of below 0° C.) of the elastomers may be the core, the outer shell or an intermediate shell (in the case of elastomers whose structure has more than two such layers). Elastomers having more than one shell may also have more than one shell made from a rubber phase.

If one or more hard components (with glass transition temperatures above 20° C.) are involved, besides the rubber phase, in the structure of the elastomer, these are generally prepared by polymerizing, as principal monomers, styrene, acrylonitrile, methacrylonitrile, α-methylstyrene, p-methylstyrene or acrylates or methacrylates, such as methyl acrylate, ethyl acrylate or methyl methacrylate. Besides these, it is also possible to use relatively small proportions of other comonomers.

It has proven advantageous in some cases to use emulsion polymers which have reactive groups at their surfaces. Examples of groups of this type are epoxy, carboxyl, latent carboxyl, amino and amide groups, and also functional groups which may be introduced by concomitant use of monomers of the formula

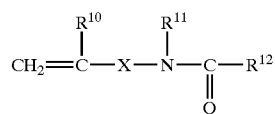

where:
$R^{10}$ is hydrogen or $C_1$–$C_4$-alkyl,
$R^{11}$ is hydrogen or $C_1$–$C_8$-alkyl or aryl, in particular phenyl,
$R^{12}$ is hydrogen, $C_1$–$C_{10}$-alkyl, $C_6$–$C_{12}$-aryl or $-OR^{13}$,
$R^{13}$ is $C_1$–$C_8$-alkyl or $C_6$–$C_{12}$-aryl, if desired with substitution by O— or N-containing groups,
X is a chemical bond or $C_1$–$C_{10}$-alkylene or $C_6$–$C_{12}$-arylene, or

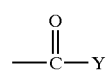

Y is O—Z or NH—Z, and
Z is $C_1$–$C_{10}$-alkylene or $C_6$–$C_{12}$-arylene.

The graft monomers described in EP-A 208 187 are also suitable for introducing reactive groups at the surface.

Other examples which may be mentioned are acrylamide, methacrylamide and substituted acrylates or methacrylates, such as (N-tert-butylamino)ethyl methacrylate, (N,N-dimethylamino)ethyl acrylate, (N,N-dimethylamino)methyl acrylate and (N,N-diethylamino) ethyl acrylate.

The particles of the rubber phase may also have been crosslinked. Examples of crosslinking monomers are 1,3-butadiene, divinylbenzene, diallyl phthalate and dihydrodicyclopentadienyl acrylate, and also the compounds described in EP-A 50 265.

It is also possible to use the monomers known as graft-linking monomers, i.e. monomers having two or more polymerizable double bonds which react at different rates during the polymerization. Preference is given to the use of compounds of this type in which at least one reactive group polymerizes at about the same rate as the other monomers, while the other reactive group (or reactive groups), for example, polymerize(s) significantly more slowly. The different polymerization rates give rise to a certain proportion of unsaturated double bonds in the rubber. If another phase is then grafted onto a rubber of this type, at least some of the double bonds present in the rubber react with the graft monomers to form chemical bonds, i.e. the phase grafted on has at least some degree of chemical bonding to the graft base.

Examples of graft-linking monomers of this type are monomers containing allyl groups, in particular allyl esters of ethylenically unsaturated carboxylic acids, for example allyl acrylate, allyl methacrylate, diallyl maleate, diallyl fumarate and diallyl itaconate, and the corresponding monoallyl compounds of these dicarboxylic acids. Besides these there is a wide variety of other suitable graft-linking monomers. For further details reference may be made here, for example, to U.S. Pat. No. 4,148,846.

The proportion of these crosslinking monomers in the impact-modifying polymer is generally up to 5% by weight, preferably not more than 3% by weight, based on the impact-modifying polymer.

Some preferred emulsion polymers are listed below. Mention is made firstly of graft polymers with a core and at least one outer shell and the following structure:

| Type | Monomers for the core | Monomers for the shell |
|------|----------------------|-----------------------|
| I | 1,3-Butadiene, isoprene, n-butyl acrylate, ethylhexyl acrylate or mixtures of these | Styrene, acrylonitrile, methyl methacrylate |
| II | As I, but with concomitant use of crosslinking agents | As I |
| III | As I or II | n-Butyl acrylate, ethyl acrylate, methyl acrylate, 1,3-butadiene, isoprene, ethylhexyl acrylate |
| IV | As I or II | As I or III, but with concomitant use of monomers having reactive groups, as described herein |
| V | Styrene, acrylonitrile, methyl methacrylate or mixtures of these | First shell made from monomers as described under I and II for the core, and second shell as described under I or IV for the shell |

These graft polymers, in particular ABS and/or ASA polymers, are used in amounts of up to 40% by weight in particular for the impact-modification of PBT, if desired in a mixture with up to 40% by weight of polyethylene terephthalate. Corresponding blend products are commercially available under the tradename Ultradur®S (previously Ultrablend®S from BASF AG). ABS/ASA mixtures with polycarbonates are available commercially under the trademark Terblend® (BASF AG).

Instead of graft polymers whose structure has more than one layer of this type it is also possible to use homogeneous elastomers, i.e. those having a single layer and made from 1,3-butadiene, isoprene and n-butyl acrylate or from copolymers of these. These products, too, may be prepared with concomitant use of crosslinking monomers or of monomers having reactive groups.

Examples of preferred emulsion polymers are n-butyl acrylate-(meth)acrylic acid copolymers, n-butyl acrylate-glycidyl acrylate or n-butyl acrylate-glycidyl methacrylate copolymers, graft polymers with an inner core made from n-butyl acrylate or based on butadiene and with an outer shell made from the abovementioned copolymers, and copolymers of ethylene with comonomers which supply reactive groups.

The elastomers described may also be prepared by other conventional processes, e.g. by suspension polymerization.

Preference is also given to silicone rubbers, as described in DE-A 37 25 576, EP-A 235 690, DE-A 38 00 603 and EP-A 319 290.

It is, of course, also possible to use mixtures of the types of rubbers listed above.

Fibrous or particulate fillers which may be mentioned are carbon fibers, glass fibers, glass beads, amorphous silica, asbestos, calcium silicate, calcium metasilicate, magnesium carbonate, kaolin, chalk, powdered quartz, mica, barium sulfate and feldspar, used in amounts of up to 50% by weight, in particular from 1 to 40% by weight, particularly from 20 to 35% by weight.

Examples of preferred fibrous fillers are carbon fibers, aramid fibers and potassium titanate fibers, and particular preference is given to glass fibers in the form of E glass. These may be used as rovings or in the commercially available forms of chopped glass.

The fibrous fillers may have been surface-precoated with a silane compound to improve compatibility with the thermoplastic.

Suitable silane compounds have the formula:

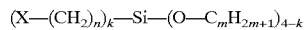

where:

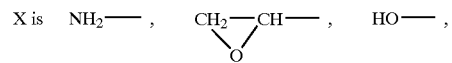

n is an integer from 2 to 10, preferably 3 or 4,
m is an integer from 1 to 5, preferably 1 or 2, and
k is an integer from 1 to 3, preferably 1.

Preferred silane compounds are aminopropyltrimethoxysilane, aminobutyltrimethoxysilane, aminopropyltriethoxysilane and aminobutyltriethoxysilane, and also the corresponding silanes which contain a glycidyl group as substituent X.

The silane compounds are generally used for surface coating in amounts of from 0.05 to 5% by weight, preferably from 0.5 to 1.5% by weight and in particular from 0.8 to 1% by weight (based on D).

Acicular mineral fillers are also suitable.

For the purposes of the present invention, acicular mineral fillers are mineral fillers with pronounced acicular character. An example is acicular wollastonite. The mineral preferably has an L/D (length to diameter) ratio of from 8:1 to 35:1, preferably from 8:1 to 11:1. The mineral filler may, if desired, have been pretreated with the abovementioned silane compounds, but the pretreatment is not essential.

Other fillers which may be mentioned are kaolin, calcined kaolin, wollastonite, talc and chalk.

The novel thermoplastic molding compositions may comprise, as component E), conventional processing aids, such as stabilizers, oxidation inhibitors, agents to prevent decomposition by heat or by ultraviolet light, lubricants, mold-release agents, colorants, such as dyes and pigments, nucleating agents, plasticizers, etc.

Examples of oxidation inhibitors and heat stabilizers are sterically hindered phenols and/or phosphites, hydroquinones, aromatic secondary amines, such as diphenylamines, various substituted representatives of these groups and mixtures of these in concentrations of up to 1% by weight, based on the weight of the thermoplastic molding compositions.

UV stabilizers which may be mentioned and which are usually used in amounts of up to 2% by weight, based on the molding composition, are various substituted resorcinols, salicylates, benzotriazoles and benzophenones.

Colorants which may be added are inorganic pigments, such as titanium dioxide, ultramarine blue, iron oxide and carbon black, and also organic pigments, such as phthalocyanines, quinacridones and perylenes, and also dyes, such as nigrosine and anthraquinones.

Nucleating agents which may be used are sodium phenylphosphinate, alumina, silica and preferably talc.

Other lubricants and mold-release agents which differ from D) and are usually used in amounts of up to 1% by weight are preferably long-chain fatty acids (e.g. stearic acid or behenic acid), salts of these (e.g. calcium stearate or zinc stearate) or montan waxes (mixtures of straight-chain saturated carboxylic acids having chain lengths of from 28 to 32 carbon atoms), and also low-molecular-weight polyethylene waxes and low-molecular-weight polypropylene waxes.

Examples of plasticizers which may be mentioned are dioctyl phthalates, dibenzyl phthalates, butyl benzyl phthalates, hydrocarbon oils and N-(n-butyl)benzenesulfonamide.

The novel molding compositions may also comprise from 0 to 2% by weight of fluorine-containing ethylene polymers. These are polymers of ethylene with a fluorine content of from 55 to 76% by weight, preferably from 70 to 76% by weight.

Examples of these are polytetrafluoroethylene (PTFE), tetrafluoroethylene-hexafluoropropylene copolymers and tetrafluoroethylene copolymers with relatively small proportions (generally up to 50% by weight) of copolymerizable ethylenically unsaturated monomers. These are described, for example, by Schildknecht in "Vinyl and Related Polymers", Wiley-Verlag, 1952, pp. 484–494 and by Wall in "Fluoropolymers" (Wiley Interscience, 1972).

These fluorine-containing ethylene polymers have homogeneous distribution in the molding compositions and preferably have a particle size $d_{50}$ (number-average) in the range from 0.05 to 10 μm, in particular from 0.1 to 5 μm. These small particle sizes may particularly preferably be achieved by using aqueous dispersions of fluorine-containing ethylene polymers and incorporating these into a polyester melt.

The novel thermoplastic molding compositions may be prepared by methods known per se, by mixing the starting components in conventional mixing apparatuses, such as screw extruders, Brabender mixers or Banbury mixers, and then extruding the same. The extrudate may be cooled and comminuted. It is also possible to premix individual components and then to add the remaining starting materials individually and/or likewise in a mixture. The mixing temperatures are generally from 230 to 290° C.

In a preferred method, components B) to D), and also, if desired, conventional additives E), can be mixed with a polyester prepolymer, compounded and pelletized. The resultant pellets are then condensed to the desired viscosity in the solid phase under an inert gas, continuously or batchwise, at a temperature below the melting point of component A).

The novel thermoplastic molding compositions have good mechanical and flame-retardant properties and also pass the glow-wire test. During their processing there is very little change in the polymer matrix, flowability is improved and mold deposits are greatly reduced. They are suitable for producing fibers, films and moldings, in particular for applications in the electrical and electronics sectors. Examples of these applications are lamp parts, such as lamp sockets and lamp holders, plugs and multipoint connectors, coil formers, casings for capacitors or connectors, and circuit-breakers, relay housings and reflectors.

EXAMPLES

Component A): Polybutylene terephthalate with a viscosity number of 130 ml/g and with a carboxyl end group content of 34 mval/kg (Ultradur® B 4500 from BASF AG) (VN measured in a 0.5% strength by weight solution of a 1:1 mixture of phenol and ortho-dichlorobenzene at 25° C. in accordance with ISO 1628).

Component B/1: Calcium phosphinate

Component B/2: $Al(CH_3C_2H_5PO_2)_3$

Component C: Resorcinol bis(diphenyl phosphate) (CR 733-S from Daihachi)

Component D: Pentaerythritol tetrastearate (Loxiol® VPG 861 from Henkel KGAA)

Component E: Chopped glass fiber of thickness 10 μm (epoxysilanized size).

Components A) to E) were blended in a twin-screw extruder at from 250 to 260° C., and extruded into a water bath. After pelletization and drying, specimens were injection-molded and tested.

The fire test was carried out to UL 94 on 1/16-inch test specimens with the usual conditioning.

Testing of stability at elevated service temperatures was carried out as follows: moldings (plaques, 60×60×2 mm, about 11 g) were injection-molded. In each case a molding was weighed on the analysis balance and heated in an aluminum dish in a circulating-air oven to the stated temperature.

After the respective storage time (3 days at 150° C.) the specimens, cooled in vacuo, were reweighed on the analysis balance and the weight loss was determined.

Flowability was measured using a flow spiral (1.5 mm) at an injection pressure of 37 bar at 260° C.

The glow-wire test was carried out on plaques of 60×60 mm and thickness 1 mm at 960° C. For this, the glow-wire was held onto the test specimen for 30 sec. The continued combustion time of the molding was determined in sec and the flame height in mm.

The makeups of the molding compositions and the results of the tests are given in the table.

TABLE

| Example | 1 Comp | 2 Comp | 3 | 4 | 5 |
|---|---|---|---|---|---|
| Component A [% by weight] | 49.7 | 49.7 | 49.7 | 49.7 | 50 |
| Component B1 [% by weight] | 20 | — | 10 | — | 10 |
| Component B2 [% by weight] | — | 20 | — | 10 | — |
| Component C [% by weight] | — | — | 10 | 10 | 10 |
| Component D [% by weight] | 0.3 | 0.3 | 0.3 | 0.3 | — |
| Component E [% by weight] | 30 | 30 | 30 | 30 | 30 |
| UL 94 | V-0 | V-0 | V-0 | V-0 | V-0 |
| Continued combustion time [sec] | 20 | 22 | 15 | 18 | 16 |
| Flame height [mm] | 46 | 45 | 25 | 35 | 25 |
| Flowability [mm] | 190 | 180 | 270 | 270 | 260 |
| weight loss [%] | 0.23 | 0.27 | 0.25 | 0.25 | 0.53 |

Comp = for comparison

We claim:

1. A thermoplastic molding composition, comprising
   A) from 5 to 96% by weight of a polyester,
   B) from 1 to 30% by weight of a phosphinate of formula I and/or of a diphosphinate of formula II and/or polymers of these

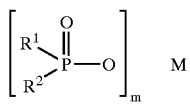
(I)

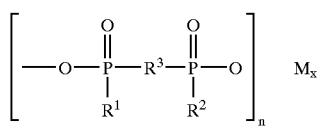
(II)

where:
$R^1$ and $R^2$ are linear or branched $C_1$–$C_6$-alkyl, phenyl or hydrogen,
$R^3$ is linear or branched $C_1$–$C_6$-alkylene, arylene, alkylarylene or arylalkylene,
M is an alkyline-earth or alkali metal, Zn, Al, Fe or B,
m is an integer from 1 to 3,
n is an integer from 1 to 3,
x is 1 or 2 and C) from 1 to 30% by weight of at least one organic phosphorus-containing flame retardant selected from triphenylphosphine oxide, triphenylphosphine sulfide, triphenyl phosphate, resorcinol bis(diphenyl phosphate), triphenylphosphine or a phosphine oxide of formula III, or mixtures of these

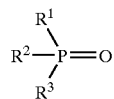
III where $R^1$, $R^2$ and $R^3$ are identical or different and are alkyl, aryl, alkylaryl or cycloalkyl having from 8 to 40 carbon atoms, and D) from 0 to 5% by weight of at least one ester or amide of saturated aliphatic carboxylic acids having from 10 to 40 carbon atoms with saturated aliphatic alcohols or amines having from 2 to 40 carbon atoms, where the total of the percentages by weight of components A) to D) is from 40 to 100%.

2. A thermoplastic molding composition as claimed in claim 1, further comprising from 1 to 40% by weight of a fibrous filler.

3. A thermoplastic molding composition as claimed in claim 1 in which component D) is pentaerythritol tetrastearate.

4. A thermoplastic molding composition as claimed in claim 1 in which component A) is composed of a mixture of polyethylene terephthalate and polybutylene terephthalate.

5. A thermoplastic molding composition as claimed in claim 4, in which the proportion of the polyethylene terephthalate in the mixture is from 10 to 30% by weight.

6. A molding obtainable from the thermoplastic molding compositions as claimed in claim 1.

7. A thermoplastic molding composition comprising
   A) from 5 to 96% by weight of a polyester,
   B) from 1 to 30% by weight of a phosphinate of formula I and/or of a diphosphinate of formula II and/or polymers of these

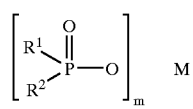
(I)

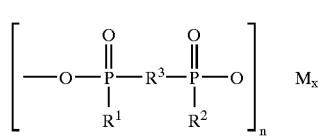
(II)

where:
$R^1$ and $R^2$ are linear or branched $C_1$–$C_6$-alkyl, phenyl or hydrogen,
$R^3$ is linear or branched $C_1$–$C_{10}$-alkylene, arylene, alkylarylene or arylalkylene,
M is an alkyline-earth or alkali metal, Zn, Al, Fe or B,
m is an integer from 1 to 3,
n is an integer from 1 to 3,
x is 1 or 2 and C) from 1 to 30% by weight of at least one organic phosphorus-containing flame retardant selected from a phbsphine, diphosphine, phosphine oxide, phosphine sulfide, triphenyl phosphate, hypophosphite, substituted phosphinic acid, anhydride of a substituted phosphinic acid, bis(diphenylphosphinic)ester, aryl(alkyl) phosphinamide, cyclic phosphonate, triaryl(alkyl) phosphite, diphosphite, cyclic phosphite, hypodiphosphate, alkyl-substituted phosphate, aryl-substituted phosphate, or cyclic phosphate, and D) from 0 to 5% by weight of at least one ester or amide of saturated aliphatic carboxylic acids having from 10 to 40 carbon atoms with saturated aliphatic alcohols or amines having from 2 to 40 carbon atoms, where the total of the percentages by weight of components A) to D) is from 40 to 100%.

8. A thermoplastic molding composition as claimed in claim 1, further comprising an elastomeric polymer.

9. A thermoplastic molding composition as claimed in claim 7, further comprsing an elastomeric polymer.

10. A thermoplastic molding composition as claimed in claim 8, wherein the elastomeric polymer is made from at least two of the monomers ethylene, propylene, butadiene, isobutene, isoprene, chloroprene, vinyl acetate, styrene, acrylonitrile and acrylates and methacrylates having from 1 to 18 carbon atoms in the alcohol component.

* * * * *

UNITED STATES PATENT AND TRADEMARK OFFICE
CERTIFICATE OF CORRECTION

PATENT NO. : 6,716,899 B1
DATED : April 6, 2004
INVENTOR(S) : Klatt et al.

It is certified that error appears in the above-identified patent and that said Letters Patent is hereby corrected as shown below:

Title page,
Item [54], Title, "FLAME-PROOFED POLYESTER MOLDING MATERIALS"
should read -- FLAME-PROOFED POLYESTER MOLDING COMPOSITIONS --

Signed and Sealed this

Twelfth Day of April, 2005

JON W. DUDAS
*Director of the United States Patent and Trademark Office*